United States Patent [19]
Themelis et al.

[11] Patent Number: 5,849,061
[45] Date of Patent: Dec. 15, 1998

[54] PROCESS FOR REFINING HIGH-IMPURITY COPPER TO ANODE COPPER

[75] Inventors: Nickolas J. Themelis, New York, N.Y.; Baozhong Zhao, Bloomfield, N.J.

[73] Assignee: The Trustees of Columbia University in the City of New York, New York, N.Y.

[21] Appl. No.: 717,425

[22] Filed: Sep. 20, 1996

[51] Int. Cl.$^6$ .................................................. C22B 15/00
[52] U.S. Cl. ............................... 75/638; 75/585; 75/414; 75/392; 75/586; 75/644; 75/645
[58] Field of Search ............................. 75/638, 585, 414, 75/392, 586, 644, 645

[56] References Cited

U.S. PATENT DOCUMENTS

| | | | |
|---|---|---|---|
| 3,623,863 | 11/1971 | Henderson et al. | 75/76 |
| 3,849,120 | 11/1974 | Norman | 75/74 |
| 4,350,524 | 9/1982 | Knoepke et al. | 75/63 |
| 4,469,513 | 9/1984 | Staib | 75/76 |
| 4,657,586 | 4/1987 | Masterson et al. | 75/76 |
| 5,007,959 | 4/1991 | Reist et al. | 75/645 |
| 5,449,395 | 9/1995 | George | 75/586 |

FOREIGN PATENT DOCUMENTS

| | | | |
|---|---|---|---|
| 4010030 | 3/1977 | France | 75/76 |

OTHER PUBLICATIONS

Themelis, N.J., "The Noranda Process for the Continuous Smelting and Converting of Copper Concentrates," *Journal of Metals*, Apr. 1972, pp. 25–32.

Themelis, N.J., "Injection Refining of Directly–Smelted Copper," *International Symposium on Injection in Process Metallurgy*, TMS Minerals, Metals and Materials Society (1991), pp. 229–251.

Stapurewicz, T.T., and Themelis, N.J., "Removal of Antimony from Copper by Injection of Soda Ash," *Metallurgical Transactions*, vol. 21B (1990), p. 967.

Taskinen, P., "Distribution Equilibria of As, Bi, Cu, Pb and Sb between Molten Copper and Soda at 1200° C," *Scandinavian Journal of Metallurgy*, vol. 11 (1982), pp. 150–154.

Eddy, C.T., "Arsenic Elimination in the Reverbatory Refining of Native Copper," *Transactions of the Metallurgical Society of the American Institute of Mining and Metallurgical Engineers*, vol. 96 (1931), pp. 104–118.

Peacey, J.G., Kubanek, G.R., and Tarassoff, P., "Arsenic and Antimony Removal from Blister Copper by Blowing and Fluxing," Noranda Research Center, TMS Paper No. A80–54, *Proceedings of the Las Vegas annual meeting*, Nevada, 1980.

Riveros, G.A., Salas, R.I., Zuniga, J.A., and Jimenez, O.H., "Arsenic Removal in Anode Refining by Flux Injection," *Mining in America, Institute of Mining & Metallurgy*, Chatman & Hall, London, 1994.

Zhao, B. and Themelis, N.J., "Removal of As, Sb and Bi from Molten Copper by $SF_6$ injection," *Proceedings of International Symposium on Co–products and Minor Elements in Nonferrous Smelting*, TMS Las Vegas Annual Meeting, Feb. 1995. pp. 39–52.

Archer, G., "Thermodynamic and Kinetic Considerations in the Removal of Blister Copper by Sulfur–hexafluoride Injection," Ph.D. Thesis, Columbia University, New York, 1987.

L. Deininger et al., "The QSL plants in Germany and Korea" in: EPD Congress 1994, T.M.S., G. Warren, ed., (Warren, Pa 1994), pp. 477–501.

*Primary Examiner*—Patrick Ryan
*Assistant Examiner*—M. Alexandra Elve
*Attorney, Agent, or Firm*—Baker & Botts, L.L.P.

[57] ABSTRACT

A process for refining high-impurity blister copper to anode quality copper is disclosed. In an oxidation step of a blister copper refining stage, soda ash fluxing removes antimony and arsenic while also removing sulfur and iron. In a deoxidation step of the blister copper refining stage, sulfur hexafluoride is injected at a controlled oxygen concentration to remove bismuth while reducing the oxygen content. Slag is continuously or periodically skimmed from the surface of the molten blister copper to prevent re-entry of impurities. The process may be carried out in batch operation or, in a preferred embodiment, in continuous flow-through operation.

16 Claims, 3 Drawing Sheets

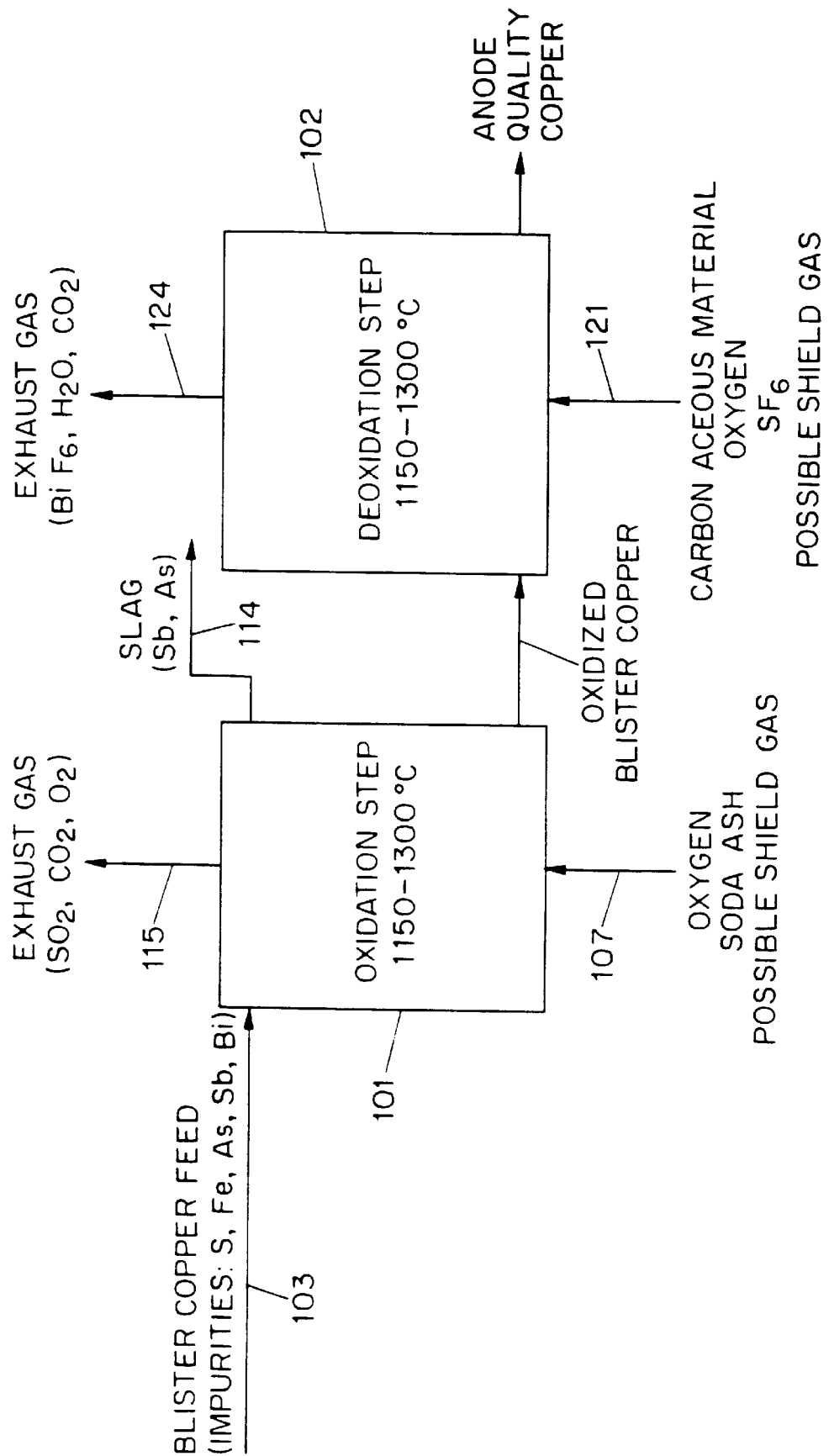

PROCESS FOR REFINING HIGH-IMPURITY COPPER TO ANODE COPPER

This invention was made in whole or in part with funds from the U.S. Government under a contract awarded by the U.S. Bureau of Mines of the Department of Industry. The U.S. Government has certain rights in this invention in accordance with the terms of the contract.

BACKGROUND OF THE INVENTION

The present invention relates to refining "blister" copper to anode quality copper and, more specifically, to refining blister copper to remove arsenic (As), antimony (Sb), and bismuth (Bi) impurities.

All existing flash- and bath-smelting processes that refine copper sulfide concentrates into blister copper consist of two stages: smelting and converting. In the smelting stage, copper-iron sulfide concentrates, which also contain "minor elements," i.e., gold (Au), silver (Ag), arsenic, antimony, and bismuth, are introduced with silica flux into a smelting furnace, into which air or oxygen-enriched air at 1150° C.–1200° C. is also injected. The air oxidizes some of the sulfur in the concentrates to sulfur dioxide, which, in turn, exits the furnace as part of a smelting "off-gas" stream. Concurrently, some of the iron reacts with the silica and oxygen to form slag. The remaining sulfur and iron combine with copper to form a copper rich matte ($Cu_2S$-FeS). As a result, three main products are generated by the smelting stage of a two-stage smelting and converting process—matte, slag, and off-gas. The minor elements are distributed among these products in the approximate proportions listed in Table 1.

TABLE 1

Approximate Distribution (%) of Minor Components Among Smelting Stage Products

|  | Matte | Slag | Off-Gas |
| --- | --- | --- | --- |
| Au, Ag | 99 | 1 | — |
| As | 35 | 55 | 10 |
| Sb | 30 | 55 | 15 |
| Bi | 10 | 10 | 80 |

The matte produced in the smelting stage of a two-stage smelting and converting process is transferred to a converting furnace, such as a Pierce-Smith converter ("PS converter"), which is maintained at about 1150°–1250° C. The converting is then carried out by further oxidizing the sulfur in the matte to sulfur dioxide ($SO_2$), which exits the converter as off-gas. Concurrently, the iron in the matte consolidates in a slag which is periodically skimmed from the surface of the melt, leaving "blister copper," which is about 98.5%–99.5% Cu. Accordingly, three products are primarily produced in the converting stage—blister copper, slag, and off-gas. The approximate distribution of minor elements among the three converting stage products is provided in Table 2.

TABLE 2

Approximate Distribution (%) of Minor Components Among Converting Stage Products

|  | Blister Copper | Slag | Off-Gas |
| --- | --- | --- | --- |
| Au, Ag | 90 | 10 | — |
| As | 15 | 10 | 75 |
| Sb | 20 | 20 | 60 |
| Bi | 5 | — | 95 |

One disadvantage of conventional two-stage smelting and converting processes is that the matte produced in the smelting furnace must be physically transferred to the converter furnace. During this transfer, fugitive emissions of $SO_2$ are generated in large quantities. In addition, slag must be periodically skimmed from the converter, and the process is not energy efficient. Due to these drawbacks, there has been a need to develop environmentally benign single-stage smelting and converting techniques that are both cost and energy efficient.

At least one of the existing copper smelting and converting techniques, the Noranda continuous smelting and converting process, has the capability of producing blister copper in a single furnace. Themelis, N. J., "The Noranda Process for the Continuous Smelting and Converting of Copper Concentrates," Journal of Metals, April 1972, pp. 25–32. This single-stage copper refining technique offers environmental and energy advantages over the conventional two-stage copper smelting and converting processes. Other single-stage copper refining techniques, such as the Outokumpu flash smelting process, can produce blister copper from chalcocite concentrates (which have low iron content) and have the future potential to produce blister copper from chalcopyrite concentrates. Themelis, N. J., "Rate Phenomena in the Outokumpu Flash Reaction Shaft," in Physical Chemistry of Reactive Metallurgy, (Kudryk and Rao, ed., TMS, Warrendale, Pa.), 1985, pp. 289–309. A significant drawback of all single-stage copper refining processes is that they each produce blister coppers which contain high levels of impurities, specifically arsenic, antimony, and bismuth.

Blister copper currently produced in conventional two-stage copper smelting and converting processes typically contains about 0.02–0.1 wt. % sulfur. To further reduce the sulfur content, the blister copper is subjected to "blister copper refining" to produce molten "anode quality" copper. Anode quality copper has a very low sulfur content (0.001–0.003 wt. % sulfur), low oxygen content (0.05–0.3 wt. % oxygen as $Cu_2O$), and only trace amounts of precious and other minor elements. Blister copper refining, which is the subject of this invention, is conventionally carried out in two steps. In the first step, batches of molten blister copper are introduced into a cylindrical "anode furnace" and an oxygen-containing gas is injected until the oxygen content reaches a level of about 0.8 wt. %, which concurrently decreases the sulfur concentration. The oxidized molten copper thus produced is then deoxidized to an oxygen level of about 0.1% by injecting a reducing gas, such as natural gas, or a reducing liquid, such as oil, or by "poling" with wood.

In a final purification stage, the molten anode quality copper is cooled, cast into anodes, and electrorefined to produce a very high purity copper product. Impurity levels in the copper product are reduced to less than 40 ppm (including sulfur), and the resulting copper purity is at least 99.99% Cu. In addition, gold, silver, and other valuable metals are recovered during this stage as by-products. However, if the impurity concentration in the anode copper starting material is too high, an excessive amount of floating "slime" forms in the electrolytic solution (or "cells"). The slime deposits on the surface of the cathodes, affects the copper quality, and decreases the energy efficiency of the electrolysis and the purity of the cathode copper produced.

Despite the energy and environmental advantages of single-stage smelting and converting techniques, the inability of these techniques to effectively remove arsenic, antimony, and bismuth presents a problem because the impurities pass through conventional blister copper refining stages and accumulate in the anode copper at levels which, as indicated in Table 3, are unacceptably high for the subsequent stage of electrorefining. As the grade and quality of copper ores decrease with time, even blister copper from conventional two-stage smelting processes may contain high levels of these undesirable elements.

TABLE 3

Impurity Levels in Anode Copper Produced by
Different Converting and Smelting Processes (ppm)

| Impurity | Two-stage | Single-stage | Max. Allowed |
| --- | --- | --- | --- |
| Arsenic (As) | 600–900 | 3000 | 1500 |
| Antimony (Sb) | 100–300 | 900 | 300 |
| Bismuth (Bi) | 30–100 | 300 | 150 |

To compensate for these increased impurity levels, researchers have recently attempted to modify existing blister copper refining techniques to remove some of the impurities. Some of these efforts are described in Themelis, N. J., "Injection Refining of Directly-Smelted Copper," *International Symposium on Injection in Process Metallurgy, TMS Minerals, Metals and Materials Society* (1991), pp 229–251. One effort described by Themelis entails fluxing the blister copper with soda ash (principally sodium carbonate—$Na_2CO_3$) to remove As and Sb. Another effort described by Themelis is $SF_6$ injection to remove Bi. The author examines the potential application of these techniques in a modified anode furnace operation that would combine the conventional oxidation/deoxidation treatment of blister copper with impurity removal by injection refining. The author explains that soda ash fluxing is effective for removing As and Sb, but not Bi, and that $SF_6$ injection has been proposed for Bi removal, but has not been used commercially due to the lack of thermodynamic and kinetic data to support a commercial design. Data is presented in the reference relating to oxidation and fluxing with sodium carbonate (i.e., soda ash), specifically for Sb removal, and a conclusion is drawn that the rate of removal is dependent on the rate and depth of soda ash injection. Similar data and conclusions are presented with regard to Bi removal by $SF_6$ injection, and the author notes that the oxygen concentration should be maintained above 0.4% (4000 ppm) during $SF_6$ injection. The reference does not address the overall amount of $SF_6$ required.

Stapurewicz, T. T., and Themelis, N. J., "Removal of Antimony from Copper by Injection of Soda Ash," *Metallurgical Transactions*, Vol. 21B (1990), pp. 967, indicates that a principal obstacle to single-stage smelting of copper is that impurities such as As, Sb, and Bi are concentrated in the copper phase, necessitating a complementary process for removing these impurities. Consequently, the reference provides a study of the thermodynamics of Sb removal from blister copper by soda ash fluxing. The authors indicate that this purification step may be performed during the blister copper refining stage, but that it has never been commercialized due to low utilization efficiencies. Among other things, the reference studies the effects of oxygen concentration by developing thermodynamic relationships, including a distribution coefficient, to relate the concentration of Sb in the copper to its concentration in the slag formed by the injection of soda ash and oxygen. In addition, the disclosed data (e.g., FIG. 1 of the reference) show that Sb removal is more efficient at higher oxygen concentrations. The reference further indicates that a proper choice of process conditions allows the Sb concentration to be lowered in 25 minutes from 1000 to 100 ppm. The reference also states that Bi cannot be removed by oxidation and fluxing. Although the reference mentions As as an impurity, it limits the study to Sb removal. The reference makes no mention of $SF_6$.

Taskinen, P., "Distribution Equilibria of As, Bi, Cu, Pb and Sb between Molten Copper and Soda at 1200° C." *Scandinavian Journal of Metallurgy*, vol. 11 (1982), pp. 150–154, describes the distribution equilibria of, inter alia, As, Bi, and Sb between copper and soda ash. The reference reports that equilibrium favors the removal of As and Sb over that of Bi. The reference also notes that equilibrium removal is favored by maintaining oxygen concentrations above 4,000 ppm.

Eddy, C. T., "Arsenic Elimination in the Reverbatory Refining of Native Copper," *Transactions of the Metallurgical Society of the American Institute of Mining and Metallurgical Engineers*, vol. 96 (1931), pp. 104–118, discusses the removal of As by soda ash fluxing at approximately 10,000 ppm oxygen, and generally emphasizes the importance of maintaining high oxygen concentration.

Peacey, J. G., Kubanek, G. R., and Tarassoff, P., "Arsenic and Antimony Removal from Blister Copper by Blowing and Fluxing," Noranda Research Center, TMS Paper No. A80-54, *Proceedings of the Las Vegas annual meeting*, Nevada, 1980, discusses the equilibria resulting from fluxing low-sulfur copper with soda ash and limestone. The reference stresses that skimming the soda ash slag creates a favorable equilibrium, and shows that higher oxygen concentrations (e.g., 4–6,000 ppm) favor faster As and Sb removal.

Riveros, G. A., Salas, R. I., Zuniga, J. A., and Jimenez, O. H., "Arsenic Removal in Anode Refining by Flux Injection," *Mining in America, Institute of Mining & Metallurgy*, Chatman & Hall, London, 1994, discloses the relationship between soda ash fluxing rates, impurity removal time and removal efficiency observed in the operation and optimization of the soda ash fluxing process at the Chuquicamata smelting facility.

Zhao, B. and Themelis, N. J., "Removal of As, Sb and Bi from Molten Copper by $SF_6$ injection," *Proceedings of International Symposium on Co-products and Minor Elements in Nonferrous Smelting*, TMS Las Vegas Annual Meeting, February 1995, pp. 39–52, discloses a process for removing impurities, particularly As, Sb, and Bi, from blister copper by $SF_6$ injection. The authors identify $SF_6$ as one of the most promising reagents for removing these impurities and suggest that the process can be practiced in existing anode furnaces. The reference states that the rate of Bi removal by $SF_6$ injection is significantly lower than that of Sb and As, and shows the relationship between impurity removal and oxygen concentration. The disclosed data suggests that oxygen concentration has little effect on Sb and As removal, but that Bi removal occurs significantly faster at lower oxygen concentrations. Based on the foregoing, Zhao and Themelis concludes that Bi should be removed at low oxygen concentrations.

Like Zhao and Themelis, U.S. Pat. No. 4,010,030, filed Sep. 8, 1975 and issued Mar. 1, 1977 to French, discloses a process for removing As, Sb, and Bi by $SF_6$ injection. The patent further indicates that high injection rates can be used to agitate the melt and that $SF_6$ in the head-space continues to react with Bi in the melt to form $BiF_3$. The patent also teaches that re-formation of CuS can be prevented by simultaneously injecting an oxygen-containing gas.

Archer, G., "Thermodynamic and Kinetic Considerations in the Removal of Blister Copper by Sulfur-hexafluoride Injection," Ph.D. Thesis, Columbia University, New York, 1987, discloses a study of $SF_6$ injection to remove Bi, responding in part to the need for a continuous impurity removal process which could complement the Noranda and Outokumpu smelting processes. Soda ash fluxing is also discussed, but the thesis does not suggest combining it with $SF_6$ injection.

Known techniques to remove impurities from blister copper suffer from several disadvantages. In the case of soda ash fluxing, the technique is ineffective at removing bismuth, which causes subsequent fouling of the cathodes in the electrorefining stage. In the case of sole $SF_6$ injection, inordinately large amounts of $SF_6$ are required to sufficiently remove the contained impurities. Accordingly, existing copper refining technology does not provide, and there exists a need for, an environmentally acceptable and cost effective technique capable of substantially removing not only As and Sb, but also Bi from future as well as current grades of high impurity blister copper.

SUMMARY OF THE INVENTION

The above-discussed shortcomings of the prior art are overcome, and the aforementioned need is substantially satisfied by the present invention, which in one aspect is a process for refining high-impurity blister copper to anode quality copper by: (1) soda ash fluxing in the oxidation step of a blister copper refining stage to remove antimony and arsenic while also removing sulfur and iron; and (2) sulfur hexafluoride injection in the deoxidation step of a blister copper refining stage at a controlled oxygen concentration to remove bismuth while reducing the oxygen content. This process overcomes the disadvantages of existing soda ash processes that use fluxing, which does not effectively remove Bi, and substantially eliminates the environmental and cost disadvantages associated with proposed methods that only use $SF_6$ injection.

Thus, one aspect of the invention is a process for refining molten blister copper into anode copper comprising two steps. Specifically, the first step comprises simultaneously injecting into the molten blister copper a first oxygen-containing gas in an amount to provide at least 5 $Nm^3$ of oxygen and at least 10 kg of soda ash for each ton of molten blister copper being refined, the injecting taking place while the molten blister copper is maintained at a temperature between 1150° C. and 1300° C. Concurrently, slag is skimmed from the surface of the molten blister copper at a rate sufficient to remove impurities from the molten blister copper. The partially refined molten copper thus produced is then subjected to the second step of deoxidation, which comprises simultaneously injecting into the partially refined molten copper a hydrocarbon, a second oxygen-containing gas in an amount sufficient to maintain an oxygen concentration of between 500 to 2000 ppm in the partially refined molten copper, and at least 0.05 kg of sulfur hexafluoride for each ton of molten blister copper being refined. The injecting takes place while the partially refined molten copper is maintained at a temperature between 1150° C. and 1300° C. The process may be carried out in batch operation or, in a preferred embodiment, in a continuous flow-through basis. Excess oxygen may be provided, e.g., 10 $Nm^3$ or more of oxygen for each ton of molten blister copper being refined, and the oxygen may be supplied by injecting air or, in a preferred embodiment, bulk oxygen. When bulk oxygen is used, a shield gas should be provided to protect the refractory walls. Preferably, such shield gas is injected as an annular gas stream surrounding the gas stream containing the bulk oxygen.

In another aspect, the injection rates of the process are based on the amounts of impurities contained in the molten blister copper being refined. In this aspect, the first step comprises injecting into the molten blister copper a first oxygen-containing gas in an amount to provide at least 0.7 $Nm^3$ of oxygen for each kg of sulfur contained in the molten blister copper being refined. Soda ash is concurrently injected in an amount to provide at least 0.7 kg of soda ash for each kg of arsenic and at least 0.4 kg of soda ash for each kg of antimony contained in the molten blister copper being refined. The injecting takes place while the molten blister copper is maintained at a temperature between 1150° C. and 1300° C., and slag is concurrently skimmed from the surface of the molten blister copper at a rate sufficient to remove impurities. The partially refined molten copper thus produced is then subjected to the second step, which comprises injecting into the partially refined molten copper a hydrocarbon, a second oxygen-containing gas in an amount sufficient to maintain an oxygen concentration of between 500 to 2000 ppm in the partially refined molten copper, and at least 0.35 kg of sulfur hexafluoride for each kg of bismuth contained in the molten blister copper being refined. The injecting takes place while the partially refined molten copper is maintained at a temperature between 1150° C. and 1300° C. These steps may be carried out in batches or, in a preferred embodiment, on a continuous flow-through basis. Excess oxygen may be provided, e.g., 0.7 $Nm^3$ or more of oxygen for each kg of sulfur contained in the molten blister copper being refined, and the oxygen may be provided by injecting air or, in a preferred embodiment, bulk oxygen. When bulk oxygen is used, a shield gas is preferably provided to protect the refractory walls.

In another aspect, the invention is a refractory furnace vessel for refining blister copper into anode copper. At least one gaseous discharge port is provided in the vessel above the molten copper to permit gases to escape, and at least one skimming port is provided in a position to permit slag on the surface of the molten copper to flow out of the vessel. Beneath the surface of the molten copper, at least one tuyere is provided for introducing a first oxygen-containing gas and soda ash into the molten copper, and at least one tuyere is provided for introducing a hydrocarbon, a second oxygen-containing gas, and sulfur hexafluoride into the molten copper. At least one copper outlet port is provided in a position to permit the refined molten copper to flow out of the vessel. In a preferred embodiment of this furnace, at least one tuyere is located in a bottom wall of the vessel. In another embodiment, at least one tuyere for introducing the soda ash into the molten copper is also used for introducing the sulfur hexafluoride. In another preferred embodiment, the furnace is cylindrical and may be rotated.

In still another aspect, the invention is a refractory furnace vessel for refining blister copper into anode copper on a continuous flow-through basis. The vessel of this aspect comprises two compartments separated by a dam, the first and second compartments being in communication with one another through a passage adjacent a lower portion of the dam near the bottom of the vessel. The first and second compartments each contain at least one gaseous discharge port located above the respective surfaces of molten copper to permit gases to escape. Similarly, the first and second compartments each contain at least one skimming port positioned to permit slag on the respective molten copper surfaces to flow out of the vessel. The vessel also contains beneath the surface of the molten copper in the first compartment at least one tuyere for introducing a first oxygen-containing gas and soda ash into the molten copper in the first compartment; and contains beneath the surface of the molten copper in the second compartment at least one tuyere for introducing a hydrocarbon, a second oxygen-containing gas, and sulfur hexafluoride into the molten copper in the second compartment. The second compartment further contains at least one copper outlet port positioned to permit refined molten copper to flow out of the vessel. In a preferred embodiment, the tuyeres in the first and second compartments are located in the bottom of the vessel. In a further preferred embodiment, the furnace is cylindrical and may be rotated.

BRIEF DESCRIPTION OF DRAWINGS

Exemplary embodiments of the present invention will now be described in detail with reference to the accompanying drawings, in which:

FIG. 1 is a process flow diagram illustrating the process aspect of the present invention with flow rates calculated on a per-ton basis of blister copper being refined.

FIG. 2 is a diagram illustrating a modified anode furnace according to the present invention carrying out the process aspect of the present invention on batches of blister copper, and in which:

DETAILED DESCRIPTION

Figure 2A:
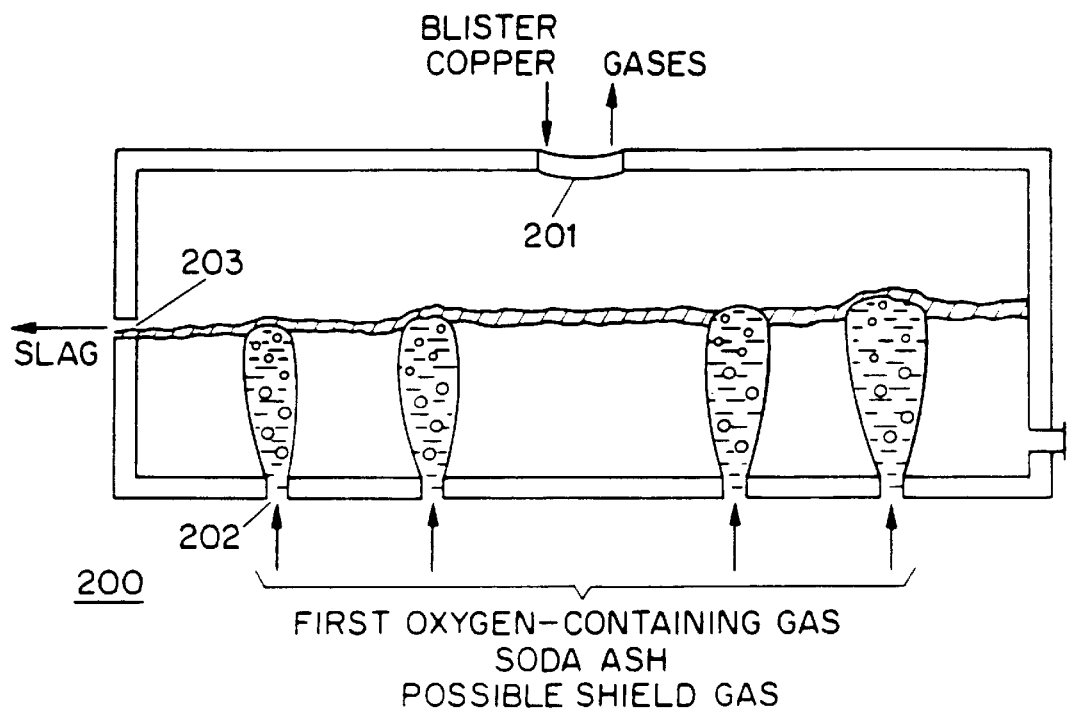
FIG. 2a shows the modified anode furnace in the first, oxidation step of the present invention.

In conventional blister copper refining, iron and sulfur (about 0.1% Fe and 0.1% sulfur as traces of copper matte) are removed by raising the blister copper oxygen concentration to about 6000 ppm in a conventional anode furnace or refining ladle. When the blister copper is produced in a single stage smelting furnace, the blister copper contains high levels of arsenic, antimony and bismuth. In several aspects, the present invention provides for the removal of these impurities from the blister copper.

One aspect of the present invention, described with reference to FIG. 1, is a batch process in which arsenic and antimony (As and Sb) are removed in a first "oxidation" step 101 and bismuth removed in a second "deoxidation" step 102, each carried out at copper smelting temperatures of 1150° C. to 1250° C. on single batches of blister copper in a modified anode furnace or refining ladle. In the first step, the anode furnace or refining ladle is charged with molten blister copper 103 that contains up to 1–2% of sulfur (S) and up to 1% iron (Fe), principally in the form of entrained matte (FeS and CuS) and copper sulfide ($Cu_2S$). Oxygen in the form of air, bulk oxygen (i.e., greater than 98 percent oxygen), or other gaseous mixture, is introduced into the melt by injection 107 through tuyeres located at the bottom of the furnace, upon which the oxygen reacts with sulfur and FeS to form $SO_2$ and FeO. If bulk oxygen is injected, the refractory walls around the tuyere should be protected from excessive localized reaction temperatures by a co-injection 107 of a shield gas such as nitrogen, hydrocarbon, steam, or a combination of appropriate gases. Preferably, such shield gas is injected as an annular gas stream surrounding the bulk oxygen-containing gas stream. The oxygen is injected until the sulfur content in the melt is lowered to about 30 ppm, corresponding to a chemical equilibrium oxygen concentration in the melt of about 6000 ppm.

In accordance with this aspect of the invention, arsenic and antimony are removed during this oxidation-removal of sulfur and iron by an injection 107 of soda ash into the melt. The soda ash particles react with As and Sb to form $Na_2O.As_2O_5$ and $Na_2O.Sb_2O_5$, which accumulate in a sodium carbonate slag on the surface of the melt. Slag removal 114 by skimming the surface of the melt is performed to prevent reentry of arsenic into the copper phase, which would otherwise occur due to the reversible nature of the reaction between soda ash and arsenic. Sufficient soda ash is added to lower the arsenic concentration to below 700 ppm, corresponding an antimony concentration of less than 100 ppm. A removal 115 of exhaust gases is accomplished by allowing the gases to escape through an exhaust port located above the surface of the melt.

Upon the removal 114 of much of the arsenic and antimony in the oxidation-step 101, a deoxidation step 102 is initiated by an introduction 121 of a chemically reducing carbonaceous material, such as natural gas, into the melt. Sufficient carbonaceous material is introduced to cause an oxygen concentration reduction from 6000 ppm to 1000 ppm. The products of this reaction are primarily carbon dioxide and steam, which exit the furnace as part of an overall exhaust gas removal 124. In accordance with the invention, sulfur hexafluoride ($SF_6$) is also introduced into the melt by injection 121. Due to the decreased concentration of arsenic and antimony, a majority of the $SF_6$ reacts with bismuth to form $BiF_3$. Although remaining arsenic and antimony also react with $SF_6$ to form $AsF_3$ and $SbF_3$, the impact of these reactions on considerations relating to $SF_6$ injection are greatly reduced. To limit the re-formation of copper sulfide (CuS), sufficient oxygen is introduced by an injection 121 of bulk oxygen, air, or other oxygen mixtures to maintain an oxygen concentration of about 1000 ppm in the melt. If the oxygen is injected as bulk oxygen, a shield gas should also be injected to protect the refractory walls. Preferably, such shield gas is injected as an annular gas stream surrounding the gas stream containing the bulk oxygen.

In another aspect, the invention is a process and apparatus for carrying out the aforementioned steps on batches of molten blister copper in a vessel comprising a modified anode furnace. As shown in FIG. 2a, which depicts such a vessel 200 in the first step of the above-described process, a port 201 is located above the surface of the melt for introducing blister copper into the vessel. At least one tuyere 202 is located in a bottom wall of the vessel, through which a first oxygen-containing gas is injected, along with soda ash and possibly a shield gas. Slag is continuously or periodically skimmed from the surface of the melt through a skimming port 203 located in a side wall of the vessel. A gaseous discharge port 201 is provided above the surface of the melt to permit gases to escape.

Figure 2B:
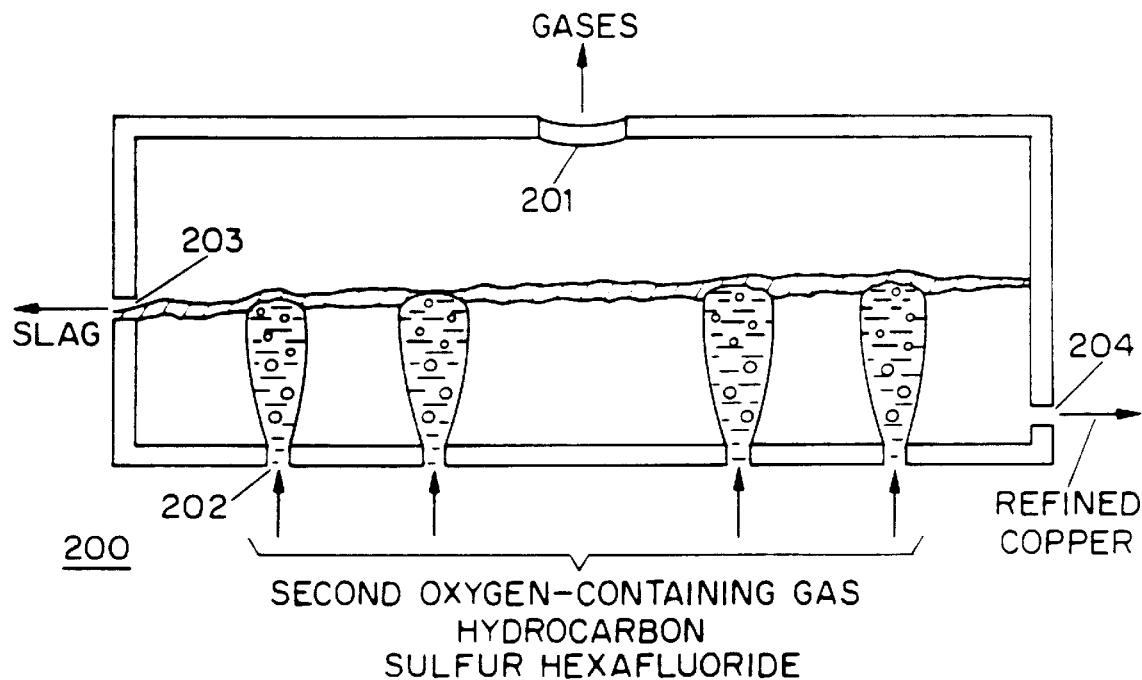
FIG. 2b shows the modified anode furnace in the second, oxidation step of the present invention.

As shown in FIG. 2b, which depicts the vessel 200 in the second step of the above-described process, at least one tuyere 202 provides a means for introducing a second oxygen-containing gas, a hydrocarbon, and sulfur hexafluoride into the melt. The gaseous discharge port 201 again allows exhaust gases to escape, while a copper outlet port 204 is positioned to allow refined copper to flow out of the vessel.

In a preferred aspect, the aforementioned oxidation removal of As and Sb, and deoxidation removal of Bi, are carried out on a continuous or semi-continuous flow-through basis in a single furnace divided by a refractory partition wall into a first "oxidation" compartment and a second "deoxidation" compartment. Similar dual-compartment furnaces have been used industrially in the QSL process for producing lead from lead concentrates (see L. Deininger et al., "The QSL plants in Germany and Korea" in: EPD Congress 1994, TMS, G. Warren, ed. , (Warren, Pa. 1994), pp. 477–501), but have not heretofore been used in blister copper refining. As shown by the apparatus diagram of FIG. 3, and referring also to the process flow diagram of FIG. 1, a dual-compartment furnace 300 for refining blister copper on a continuous flow-through basis may be supplied by modifying a known cylindrical anode furnace to include a refractory partition 303 dividing the furnace into two compartments. An opening 304 near the bottom of the partition is incorporated to allow copper to continuously flow from the first compartment to the second compartment.

In accordance with the preferred embodiment, oxidation-removal of sulfur is effectuated continuously in the first compartment 301 by an injection 107 of bulk oxygen, air, or another oxygen-containing gas mixture into the melt. A removal 114 of much of the arsenic and antimony is accomplished by a co-injection 107 of soda ash and by continuously or periodically skimming 114 slag from the surface of the melt contained in the first compartment. The resulting partially refined copper, from which sulfur, iron, arsenic and antimony have been largely removed, continuously flows into the second compartment 302, where an oxygen concentration reduction is accomplished by a continuous or semi-continuous introduction 121 of carbonaceous material. Concurrently, bismuth is removed by a continuous or periodic injection 121 of sulfur hexafluoride ($SF_6$) into the melt. Again, although $SF_6$ reacts with remaining arsenic and antimony in the melt, the levels of these impurities are sufficiently low that environmental and cost concerns raised by $SF_6$ injection are alleviated. Sufficient injection 121 of an oxygen-containing gas suppresses the re-formation of copper sulfide caused by a reaction of copper with $SF_6$.

Figure 3:
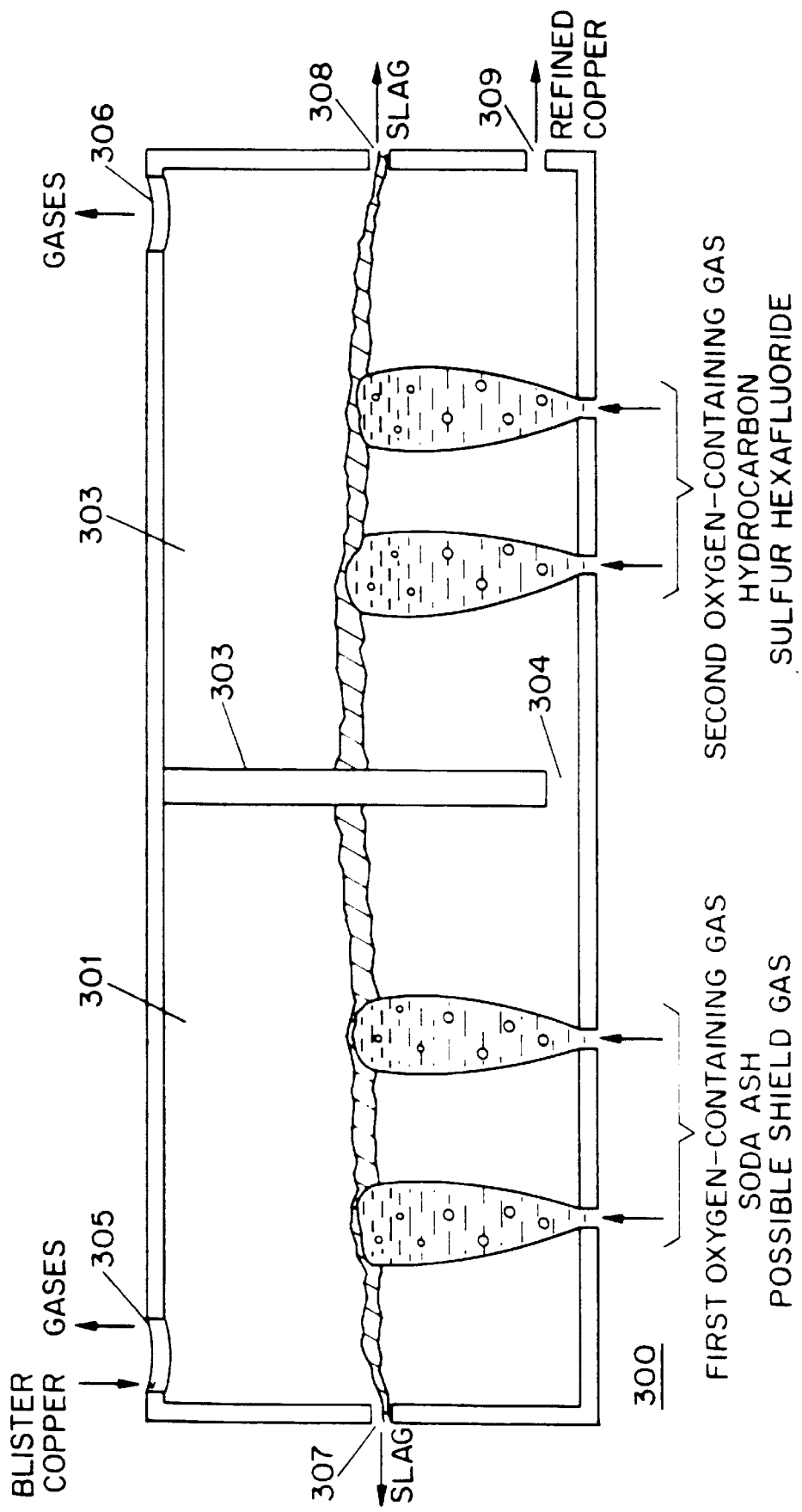
FIG. 3 is a diagram illustrating a modified anode furnace according to the present invention carrying out the process aspect of the present invention which operates on a continuous flow-through basis.

Referring now to FIG. 3, there is shown an anode furnace according to a preferred embodiment of the present invention in which impurities are removed from blister copper on a continuous flow-through basis. The furnace 300 depicted in FIG. 3 includes a first "oxidation" compartment 301 and a second "deoxidation" compartment 302, each separated by a refractory partition 303. In this example, the blister copper refining operation is downstream of a Noranda single-stage smelting and converting process capable of producing about 100,000 metric tons of copper per year and refining 15 t/h of blister copper. Without limiting the geometrical configuration, the blister copper refining furnace is a modified cylindrical anode furnace with approximate internal dimensions of 3-meters in diameter by 9-meters in length, as depicted in FIG. 3. The refractory partition 303 dividing the two compartments has a bottom opening to allow the flow of copper from the first compartment into the second compartment. Such a furnace could be provided by installing a partitioning refractory wall into a known cylindrical anode furnace, along with appropriate tuyeres and orifices.

Molten blister copper may be charged continuously or intermittently into the first compartment 301 by turning the furnace through an appropriate angle so that the opening 305 at the left end of the top of the first compartment 301 moves downward from a gas hood (not shown) into a position that allows contents of a copper ladle to be emptied into the first compartment 301. This operation is similar to that used to charge existing conventional anode furnaces. The compositions are those typical of blister copper produced by single stage refining operations, namely 1–2% sulfur and about 0.5% iron, principally in the form of entrained matte, and the "single-stage" impurity levels provided in Table 1.

In the exemplary apparatus shown in FIG. 3, the oxidation compartment 301 is provided with two oxygen injection tuyeres (not shown) at the bottom of the compartment 301, each of which injects approximately 150 $Nm^3/h$ of oxygen ($O_2$) and sufficient shielding gas ($N_2$) to thermally protect the refractory walls. (The metric unit, $Nm^3/h$, is a "normal cubic meter per hour," and corresponds to the equivalent amount of gas contained in one cubic meter at normal temperature (0° C.) and pressure (1 atm.)). The injected gas forms a gas-liquid plume above the orifice and also results in a relatively large recirculating velocity (approximately 0.5–1.0 m/s) of liquid metal in the rest of the melt. At an estimated 80% utilization, this amount of oxygen sufficiently oxidizes the sulfur and iron in the blister copper, and provides a first-compartment copper effluent stream that contains about 30 ppm sulfur and 6000 ppm oxygen. These concentrations correspond to an equilibrium state between the sulfur and oxygen, which is achieved because the agitation caused by the injected oxygen-containing gas makes the compartment a nearly perfectly mixed reactor.

As mentioned, the tuyeres used for injecting bulk oxygen are of the gas-shielded type, wherein the shield gas (such as nitrogen, hydrocarbon, or steam) is injected through an annulus surrounding the oxygen stream. Such tuyeres are known and have been used successfully in steel making converters and in lead smelting.

While the sulfur is being removed by oxygen injection, arsenic and antimony are removed by introducing soda ash into the injected gas stream by means of a conventional solids feeder (not shown) at an average rate in this example of 150 kg/h, i.e., about 10 kg per ton of copper refined. The soda ash addition is discontinued briefly when new batches of blister copper are added to the oxidation compartment. The entrained sodium carbonate particles, which have a lower melting point (851° C.) than copper (1083° C.), melt instantaneously and react with As and Sb either as they rise through the melt or after they reach the slag-metal interface. The size of these particles are preferably less than 20 mesh in size.

The rising droplets of sodium carbonate ($Na_2CO_3$) react with the impurities in the first compartment copper melt according to the following reactions:

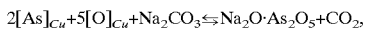

and

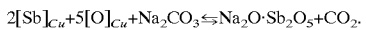

The resulting sodium carbonate slag accumulates on the surface of the melt and is skimmed periodically or continuously through a skimming port, which is shown in FIG. 3 in the left wall of the oxidizing compartment. Skimming is facilitated by the presence of plumes which push the slag towards the decreased surface level near the skimming port. It is advantageous to continuously or periodically remove this high impurity slag from the furnace because a failure to do so decreases the effectiveness of the impurity removal. The skimmed sodium carbonate may be treated by simple water leaching and crystallization to recover reusable sodium carbonate and arsenic and bismuth salts.

As shown in FIG. 3, an opening 304 located at the bottom of the refractory partition 303 permits copper to continuously flow from the first compartment 301 oxidizing zone into the second compartment 302 deoxidizing zone. The size of the opening 304 is designed so that back-flow caused by turbulent circulation in the second compartment 302 is much less than the bulk flow of copper into the second compartment. Preventing back-flow and incident mixing provides a beneficially substantial difference in impurity concentrations between the two compartments.

Under the foregoing operating conditions, the arsenic distribution coefficient, $L_{As}$, is about 1600, where $L_{As}$ is defined as the ratio of arsenic content in the slag to arsenic content in the metal-phase. The corresponding distribution coefficient for antimony, $L_{Sb}$, is about 40. Under these conditions, arsenic and antimony decrease from about 3400 ppm to about 200 ppm and from about 980 ppm to about 700 ppm, respectively. Bismuth removal is insignificant and the bismuth content in the molten metal is about 300 ppm. The flow rate of exhaust gas from the first compartment is about 1000 $Nm^3/h$, which includes an estimated 100% infiltration of atmospheric air through the gap between the furnace entrance and gas collection hood. This gas may be treated (e.g., scrubbed or recycled) with other smelter gases.

In the second compartment, the oxidized blister copper is chemically reduced by introducing carbonaceous material into the melt, which reacts with the oxygen and thereby reduces the oxygen concentration from about 6000 ppm to about 1000 ppm. The carbonaceous material may be natural gas (principally methane ($CH_4$)) or another hydrocarbon, such as propane, oil, or even fine coal particles. The apparatus depicted in FIG. 3 illustrates an example in which a mixture of natural gas and oxygen is introduced by means of two gas injection tuyeres (not shown) located along the bottom of the second compartment. The oxygen, which may itself be supplied as bulk oxygen, air, or other oxygen-containing mixtures, serves to partially combust, preheat and reform the hydrocarbon. Sufficient oxygen is supplied to maintain a 0.1–0.3 oxygen/hydrocarbon injection lambda factor, which is defined as the ratio of oxygen injected to the amount required for stoichiometric combustion of the hydrocarbon. For example, when natural gas is injected, the stoichiometric combustion requirement is approximately two volumes of oxygen for each volume of natural gas, as estimated by the stoichiometric equation for methane:

$$CH_4 + 2O_2 \leftrightarrows CO_2 + 2H_2O.$$

Accordingly, an injection gas that contains one volume of $O_2$ per volume of natural gas has an oxygen/hydrocarbon injection lambda factor of about 0.5.

The hydrocarbon injection rate is determined by: a) the amount of hydrocarbon necessary to decrease the inlet flow oxygen concentration from 6000 ppm to the required exit concentration of 1000 ppm; b) thermodynamic constraints on the chemical reduction reaction in the bath; and c) the injection rate of oxygen into the bath. In view of these considerations, it is desirable to maintain less than 0.9 as "bath lambda factor," which is defined as the ratio:

$$\frac{\text{(oxygen injected + oxygen to be removed from copper melt)}}{\text{(oxygen required to completely combust the hydrocarbons)}}.$$

For the assumed blister copper processing rate of 15 t/h, and oxygen/hydrocarbon injection lambda factor of 0.1, the calculated total injection rate is 75 $Nm^3/h$ of $CH_4$ and 15 $Nm^3/h$ of $O_2$, and the corresponding bath lambda factor is 0.9. This gas flow, along with the required flow of nitrogen or other shielding gas, is injected through tuyeres. The injection creates a gas-liquid plume, where most of the reducing reaction takes place. The gas injection also creates a recirculating flow of somewhat lower velocity than in the oxidizing compartment, but sufficient to mimic a perfectly mixed reactor. Therefore, at least in the second half of the second compartment, the melt has essentially the same composition as the exiting molten copper stream.

Even at a bath lambda factor of 0.9, the gas exiting the melt continues to have a reducing potential, so that some reducing reaction continues between the hydrocarbon in the gas atmosphere above the melt surface and the oxygen in the melt. To further utilize the remaining unreacted gas, it is advantageous to inject air or oxygen from or near the roof of the furnace to scavenge the remaining hydrocarbon and thereby release sufficient heat of combustion to satisfy the temperature requirements of the process. Also, auxiliary burners are appropriate for the first and second compartments to preheat the furnace and to maintain the furnace temperature during stand-by periods.

At an oxygen/hydrocarbon injection lambda factor of 0.1 and a bath lambda factor of 0.9, the percent utilization efficiency (% UE—the fraction of injected hydrocarbon reacting with oxygen in the melt) of the input natural gas for deoxidation is 60%. This is nearly double the % UE reported for conventional batch anode furnaces, in which nearly 300 tons of copper are treated over a 2–3 hour period. A much higher efficiency is provided by the continuous flow furnace of the present invention, at least in part because:
a) the gas flow rate per injector is much lower;
b) the volume of melt associated with each injector is much less;
c) the injectors are more effective due to their deeper location in the bath; and
d) the injection of some oxygen along with the gas assists in pre-reforming and pre-heating the reducing gas.

Removal of bismuth is effected in the second compartment by adding sulfur hexafluoride ($SF_6$) to the gas injection stream. Experimental results have shown that the bismuth rate of reaction is slower than that of arsenic and antimony. Thus, although $SF_6$ is injected primarily to remove bismuth, much of the remaining antimony and arsenic is removed as well. The principal chemical reactions involved are as follows:

$$2[Bi]_{Cu} + SF_6 + 2[O]_{Cu} = 2BiF_3 + SO_2,$$

$$2[Sb]_{Cu} + SF_6 + 2[O]_{Cu} = 2SbF_3 + SO_2, \text{ and}$$

$$2[As]_{Cu} + SF_6 + 2[O]_{Cu} = 2AsF_3 + SO_2.$$

By using the proposed furnace shown in FIG. 3 and assuming 50% loading of the furnace (i.e., 50% of the furnace being occupied by the copper melt), the average residence time of copper melt in the reducing zone is about 10 hours, which provides ample time for the metal-phase reactions.

In a 15 t/h blister copper refining operation, adding 1.8 Nm$^3$/h of sulfur hexafluoride constitutes about 2.0% of the total injection flow. Under such operating conditions, test results indicate that the copper exiting the reducing compartment contains about 30 ppm sulfur, 1000 ppm oxygen, and less than 100 ppm each of As, Sb and Bi. If a higher level of As is desired by the electrorefinery, then part of the arsenic salt recovered from the slag skimmed from the surface of the melt in the first compartment can be dissolved in the molten copper from which bismuth has been removed. The overall utilization of SF$_6$, i.e., SF$_6$ used for As, Sb and Bi removal, is about 60–70%. Experiments have shown that the utilization efficiency is increased at lower gas injection rates by lowering the SF$_6$ partial pressure in the injection gas.

The purified copper exits the second compartment of the furnace either periodically or continuously, and is suitable for casting into copper anodes to be used in the subsequent electrorefining process. When refining 15 t/h of blister copper, the exhaust gas flow rate from the second compartment is estimated to be about 500 NM$^3$/h, which includes air infiltration through the furnace hood. Wet scrubbing, as used in the aluminum industry for treating fluoride-containing gases, is advantageously used to treat this gaseous effluent.

We claim:

1. A process for refining molten blister copper into anode copper comprising:
   a. a first step of simultaneously injecting into molten blister copper a first oxygen-containing gas in an amount to provide at least 5 Nm$^3$ of oxygen and at least 10 kg of soda ash for each ton of molten blister copper being refined, the injecting taking place while the molten blister copper is maintained at a temperature between 1150° C. and 1300° C., and skimming slag from a top surface of the molten blister copper during the injecting of the first oxygen-containing gas and the soda ash, at a rate sufficient to remove impurities from the molten blister copper, thereby producing partially refined molten copper; and
   b. a second step of simultaneously injecting into the partially refined molten copper a hydrocarbon, a second oxygen-containing gas in an amount sufficient to maintain an oxygen concentration of between 500 to 2000 ppm in the partially refined molten copper, and at least 0.05 kg of sulfur hexafluoride for each kg of bismuth in the molten blister copper being refined, the injecting taking place while the partially refined molten copper is maintained at a temperature between 1150° C. and 1300° C.

2. The process according to claim 1, wherein the process is carried out on batches of blister copper in a single vessel.

3. The process according to claim 1, wherein the process is carried out on a continuous flow-through basis.

4. The process according to claim 1, wherein the first oxygen-containing gas provides at least 10 Nm$^3$ of oxygen to the molten blister copper for each ton of molten blister copper being refined.

5. The process according to claim 1, wherein the first oxygen-containing gas comprises air.

6. The process according to claim 1, wherein the first oxygen-containing gas comprises bulk oxygen.

7. The process according to claim 6, wherein a shield gas is injected into the molten blister copper.

8. The process according to claim 7, wherein the shield gas is injected through an annular space surrounding the injected bulk oxygen.

9. A process for refining molten blister copper into anode copper comprising:
   a. a first step of simultaneously injecting into molten blister copper:
      i. a first oxygen-containing gas in an amount to provide at least 0.7 Nm$^3$ of oxygen for each kg of sulfur contained in the molten blister copper being refined,
      ii. at least 0.7 kg of soda ash for each kg of arsenic contained in the molten blister copper being refined, and
      iii. at least 0.4 kg of soda ash for each kg of antimony contained in the molten blister copper being refined, the injecting taking place while the molten blister copper is maintained at a temperature between 1150° C. and 1300° C.; and concurrently skimming slag from a top surface of the molten blister at a rate sufficient to remove impurities from the molten blister copper, thereby producing partially refined molten copper; and
   b. a second step of simultaneously injecting into the partially refined molten copper:
      i. a hydrocarbon,
      ii. a second oxygen-containing gas in an amount sufficient to maintain an oxygen concentration of between 500 to 2000 ppm in the partially refined molten copper, and
      iii. at least 0.35 kg of sulfur hexafluoride for each kg of bismuth contained in the molten blister copper being refined,
the injecting taking place while the partially refined molten copper is maintained at a temperature between 1150° C. and 1300° C.

10. The process according to claim 9, wherein the process is carried out on batches of blister copper in a single vessel.

11. The process according to claim 9, wherein the process is carried out on a continuous flow-through basis.

12. The process according to claim 9, wherein the first oxygen-containing gas provides at least 1 Nm$^3$ of oxygen to the molten blister copper for each kg of sulfur contained in the molten blister copper being refined.

13. The process according to claim 9, wherein the first oxygen-containing gas comprises air.

14. The process according to claim 9, wherein the first oxygen-containing gas comprises bulk oxygen.

15. The process according to claim 14, wherein a shield gas is injected into the molten blister copper.

16. The process according to claim 15, wherein the shield gas is injected through an annular space surrounding the injected bulk oxygen.

* * * * *